United States Patent [19]

Fock

[11] 4,456,773
[45] Jun. 26, 1984

[54] PROCESS FOR THE PREPARATION OF POLYOXYALKYLENE ETHERS

[75] Inventor: Jürgen Fock, Düsseldorf, Fed. Rep. of Germany

[73] Assignee: Th. Goldschmidt AG, Essen, Fed. Rep. of Germany

[21] Appl. No.: 416,554

[22] Filed: Sep. 10, 1982

[30] Foreign Application Priority Data

Oct. 23, 1981 [DE] Fed. Rep. of Germany ....... 3142041

[51] Int. Cl.$^3$ ..................... C07C 41/02; C07C 43/13
[52] U.S. Cl. ..................... 568/608; 568/616; 568/618
[58] Field of Search ............... 568/608, 618, 616, 607

[56] References Cited

U.S. PATENT DOCUMENTS

| | | | |
|---|---|---|---|
| 2,782,240 | 2/1957 | Hefner et al. ................. | 568/608 |
| 4,223,163 | 9/1980 | Guilloty ....................... | 568/618 |

*Primary Examiner*—Bernard Helfin
*Attorney, Agent, or Firm*—Toren, McGeady and Stanger

[57] ABSTRACT

A process for the preparation of polyoxyalkylene ethers of the formula $$R^1O-[C_nH_{2n}O-]_xM$$

in which
  $R^1$ is an alkyl radical with 1 to 4 carbon atoms, an alkylene radical, an aryl radical or an alkaryl radical,
  M is an alkali cation,
  n is any number from 2 to 3, and
  x is a whole number, by the stoichiometric polymerization of alkylene oxides or their mixtures having the general formula $C_nH_{2n}O$ on alkali alcoholate mixtures, composed of 1 to 20 mole percent of potassium alcoholate and 99 to 80 mole percent of sodium alcoholate. Compared to the use of sodium alcoholate alone, the addition reaction proceeds uniformly at temperatures as low as 80° to 100° C. and the initial delay at the start of the reaction is avoided. Even so, it is possible to keep the isomerization of propylene oxide to allyl alcohol within limits. Products are obtained with a relatively narrow molecular weight distribution and a low double bond content.

8 Claims, 4 Drawing Figures

PROCESS FOR THE PREPARATION OF POLYOXYALKYLENE ETHERS

BACKGROUND OF THE INVENTION

1. Field of the Invention

The invention relates to a process for the preparation of polyoxyalkylene ethers of the formula $$R^1O-[C_nH_{2n}O-]_xM$$

in which
- $R^1$ is an alkyl radical with 1 to 4 carbon atoms, an alkylene radical, an aryl radical or an alkaryl radical,
- M is an alkali cation,
- n is any number from 2 to 3, and
- x is a whole number, by stoichiometrically polymerizing alkylene oxides or their mixtures having the general formula $C_nH_{2n}O$ on alkali alcoholates having the general formula $MOR^1$ at temperatures of 60° C. to 150° C.

2. Description of the Prior Art

German patent application No. P 31 21 929.2 describes a process for the preparation of polyoxyalkylene monoallyl or methallyl ethers of the general formula $$R^1O-[C_nH_{2n}O-]_xCH_2\underset{R^2}{C}=CH_2$$

in which
- $R^1$ is an alkyl radical with 1 to 4 carbon atoms, an aryl radical or an alkaryl radical,
- $R^2$ is hydrogen or a methyl radical,
- n is any number from 2 to 3, and
- x is a whole number, and which has a narrow molecular weight distribution. The distinguishing feature of this process is that the polyoxyalkylene ether having the formula $R^1O-[C_nH_{2n}O-]_xM$ is first synthesized by the stoichiometric polymerization of alkylene oxides or their mixtures of the general formula $C_nH_{2n}O$ on alkali alcoholates of the general formula $MOR^1$, in which M is an alkali cation, at temperatures of 60° to 130° C. This intermediate product is then reacted with an allyl or methallyl halide in a well known manner and the product is separated from the salt MX which is formed as a by-product.

Accordingly, in the first step of this process, an alkylene oxide of the formula $C_nH_{2n}O$ is added to stoichiometric amounts of an alkali alcoholate of the general formula $MOR^1$ in a conventional manner. As used herein, stoichiometric amount means the amount of alcoholate which is equivalent to the number of resulting polyoxyalkylene chains, so that each individual chain is started by an alkoxy anion and each chain has an alkali ion.

It was, however, surprising that in spite of the use of large amounts of alkali alcoholates, the isomerization of propylene oxide to allyl alcohol, which is well known as such and to be expected, takes place to only a very slight extent. Also, the intermediate products obtained in the first step of the process have only a low double bond content. This isomerization of propylene oxide, which is to be expected, is largely avoided especially when the propylene oxide, optionally in admixture with ethylene oxide, is added to sodium methylate at temperatures up to 100° C.

In carrying out this step of the process, it turns out that delays in the addition reaction of the alkylene oxide are observed now and then. The alkylene oxide supplied to the reactor, does not initially add on, so that as more alkylene oxide is supplied, the amount of unreacted alkylene oxide in the reactor increases until the reaction then starts and, due to the heat of reaction released, accelerates and proceeds explosively. Consequently, due to the temperature and pressure increase in a reaction which starts so suddenly, disturbances in the molecular weight distribution and the composition of the reaction products may occur. Also, a reaction which starts so precipitously, can endanger the operating personnel.

Such delays in the onset of the reaction occur especially in the temperature range up to about 100° C. If the reaction temperature is raised to about 120° to 130° C., the tendency for such reactions to be delayed is reduced. However, a higher reaction temperature favors the formation of products of relatively lower molecular weight, so that the hydroxyl number found is larger than the theoretically calculated hydroxyl number of the product. Moreover, the isomerization to allyl alcohol is favored when propylene oxide is used as the alkylene oxide.

SUMMARY OF THE INVENTION

We have discovered a method for improving the course of the addition reaction of the alkylene oxide or the alkylene oxide mixture, so that the addition reaction proceeds uniformly, rapidly and without delay even at a reaction temperature of 80° to 100° C. More particularly, the process of the present invention is a method for the preparation of polyoxyalkylene ethers of the formula $$R^1O-[C_nH_{2n}O-]_xM$$

in which
- $R^1$ is an alkyl radical with 1 to 4 carbon atoms, an alkylene radical, an aryl radical or an alkaryl radical,
- M is an alkali cation,
- n is any number from 2 to 3, and
- x is a whole number, by stoichiometrically polymerizing alkylene oxides or their mixtures having the general formula $C_nH_{2n}O$ on alkali alcoholates having the general formula $MOR^1$ at temperatures of 60° C. to 150° C., wherein 1 to 20 mole percent of potassium alcoholate and 99 to 80 mole percent of sodium alcoholate are used as the alkali alcoholate mixture. Preferably, 5 to 15 mole percent of potassium alcoholate and 95 to 85 mole percent of sodium alcoholate are used as alkali alcoholate mixture.

DESCRIPTION OF THE PREFERRED EMBODIMENTS

Figure 1:
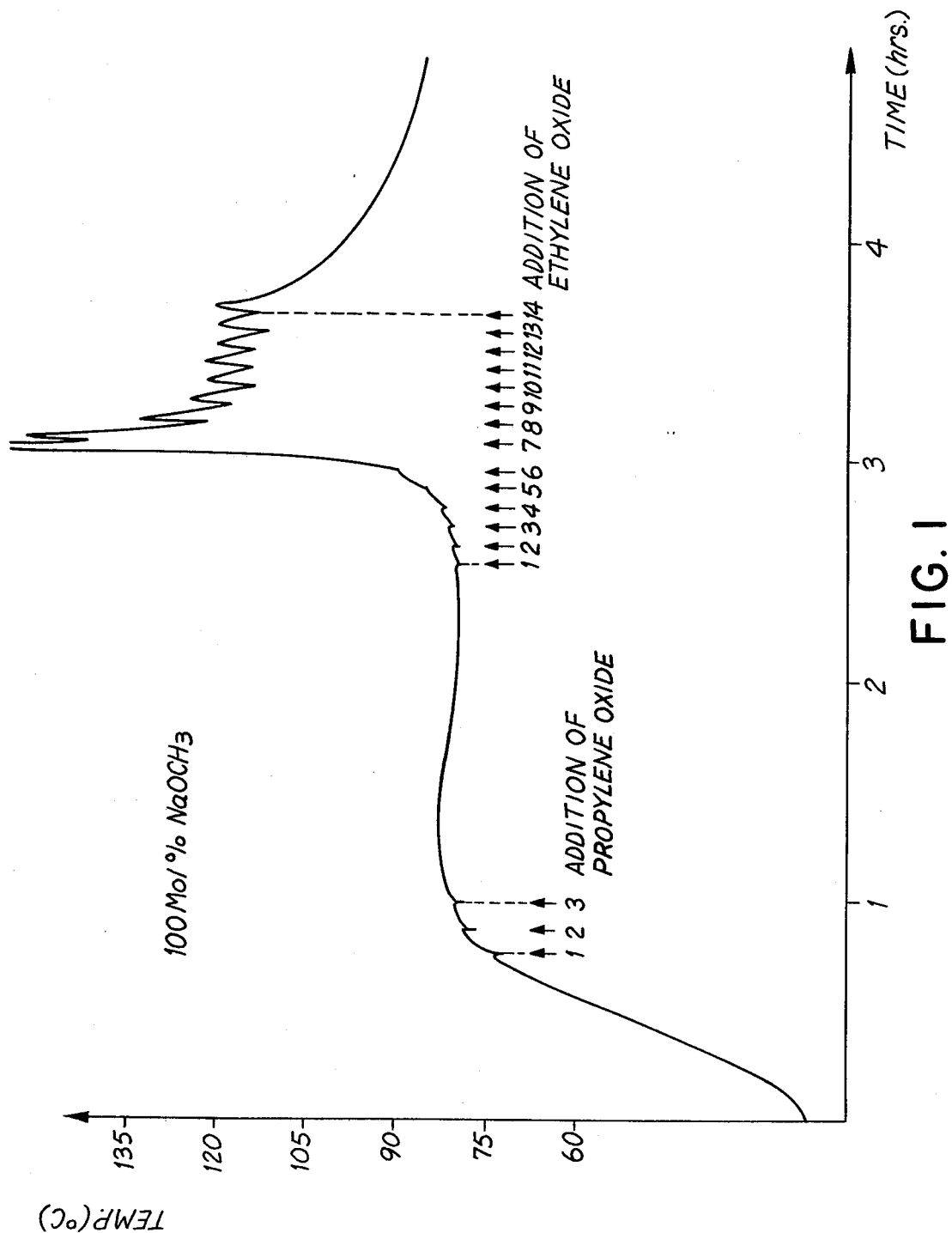
FIGS. 1, 2, 3 and 4, are graphs showing the variation in temperature with time for the addition reaction of the present invention.

As alkali radicals with 1 to 4 carbon atoms, methyl, ethyl, n-propyl, isopropyl, n-butyl, and isobutyl radicals are mentioned. The aryl radical generally is the phenyl radical, which may also be substituted. Alkyl radicals are preferred as substituents. The partial replacement of sodium alcoholate with potassium alcoholate brings about the desired uniformity in the course of the reaction. In this connection, it was surprising that, on the one hand, the course of the reaction proceeds smoothly and, on the other, the isomerization of propylene oxide to allyl alcohol can nevertheless be kept within limits. This means that using the alkali alcoholate mixture of the present invention, polyoxyalkylene ethers are obtained at relatively low reaction temperatures, whose content of unsaturated compounds is lower than when the sodium alcoholate is used according to the state of the art and one is forced to maintain temperatures of 120° C. to 130° C.

Due to the possibility of being able to carry out the reaction smoothly at temperatures as low as 80° to 100° C., polyoxyalkylene ethers are obtained having a narrow molecular weight distribution and a double bond content, which is lower than that which would result at higher temperatures. These products have a hydroxyl group content as determined by the OH number which corresponds significantly better to the theoretically calculatable hydroxyl number than the products obtained with the known process.

A particular development of the inventive process is that the reaction is carried out in a diluent, such as, aliphatic or aromatic hydrocarbons. Examples of such diluents are hexane and toluene. Particularly good results are obtained when the reaction is carried out in a complexing solvent or diluent, which brings about a separation of the ions. Such diluents are, for example, polyoxyalkylene monoethers or diethers.

In this connection, it has turned out that the addition reaction proceeds particularly rapidly and smoothly when the alkali alcoholate mixture is dispersed as finely as possible in the diluent. This can be accomplished with the help of a high-shear stirrer. Examples of high-shear stirrers are those which operate according to the rotor-stator principle and are available in the trade under the name ULTRA-TURRAX and SUPRATON. The fine dispersion of the alkali alcoholate mixture leads to a considerable increase in the reaction rate. Products with a very uniform distribution of ethylene oxide and propylene oxide are obtained especially in the case of the discontinuous addition of small amounts of an ethylene oxide/propylene oxide mixture.

The inventively prepared polyoxyalkylene ethers can be processed further in the usual manner. The inventively obtained alkali salts of the polyoxyalkylene ethers can be converted into polyoxyalkylene monoalkyl ethers by the action of acid, for example, aqueous hydrochloric acid. Corresponding to the process shown in patent application P 31 21 929.2, the alkali salts of the inventively obtained polyoxyalkylene ethers can be reacted with halogenated hydrocarbons using the Williamson synthesis. Suitable as halogenated hydrocarbons are saturated as well as unsaturated halogenated hydrocarbons with one or more halogen atoms in the molecule, preferably chlorine or bromine. Suitable compounds include methyl, ethyl, n-propyl or isopropyl chloride and primary, secondary or tertiary butyl chloride, as well as allyl or methallyl chloride, benzyl chloride, methyl or ethyl bromide and dibromomethane.

The inventive process is illustrated by the following examples.

EXAMPLE 1

Sodium methylate (243 g, approximately 4.5 moles) and 35 g (approximately 0.5 moles) of potassium methylate are dispersed in 1250 ml of anhydrous toluene in a reactor with a forced circulation system and an additional stirrer. After the reactor is flushed carefully with pure nitrogen, it is heated to 80° C. and a mixture of 768 g (approximately 13.2 moles) of propylene oxide and 3,072 g (ca. 70 moles) of ethylene oxide is added so rapidly that the internal temperature of the reactor does not exceed 90° C. and the internal pressure does not exceed 3 bar. After the addition of the alkylene oxide mixture is completed, the temperature is maintained at 80° C., until a constant pressure indicates the end of the reaction. Subsequently, the residual monomers and the toluene are removed under vacuum at 80° C. to 90° C.

A sample of the product obtained is neutralized with the help of phosphoric acid, the water is removed by distillation and the sodium phosphate formed by filtration with a filter aid. The hydroxyl number of the product is 72. Assuming a functionality of 1, this hydroxyl number corresponds to a molecular weight of 779; the iodine number is 1.1 and therefore corresponds to a double bond content of 3.4 mole percent.

EXAMPLE 2

To mixtures of sodium and potassium alcoholate of different composition, each of which was dispersed in 250 ml of toluene, 150 g (approximately 2.6 moles) of propylene oxide is added in a first stage and 620 g (approximately 14.1 moles) of ethylene oxide in a second stage, in accordance with the procedure of Example 1. The addition of the propylene oxide was carried out in 3 steps of 50 ml each at intervals of 7 minutes and the addition of ethylene oxide was carried out in 13 steps of 50 ml each. After each stage, 1.5 hours were allowed to elapse in order to complete the reaction.

Figure 2:
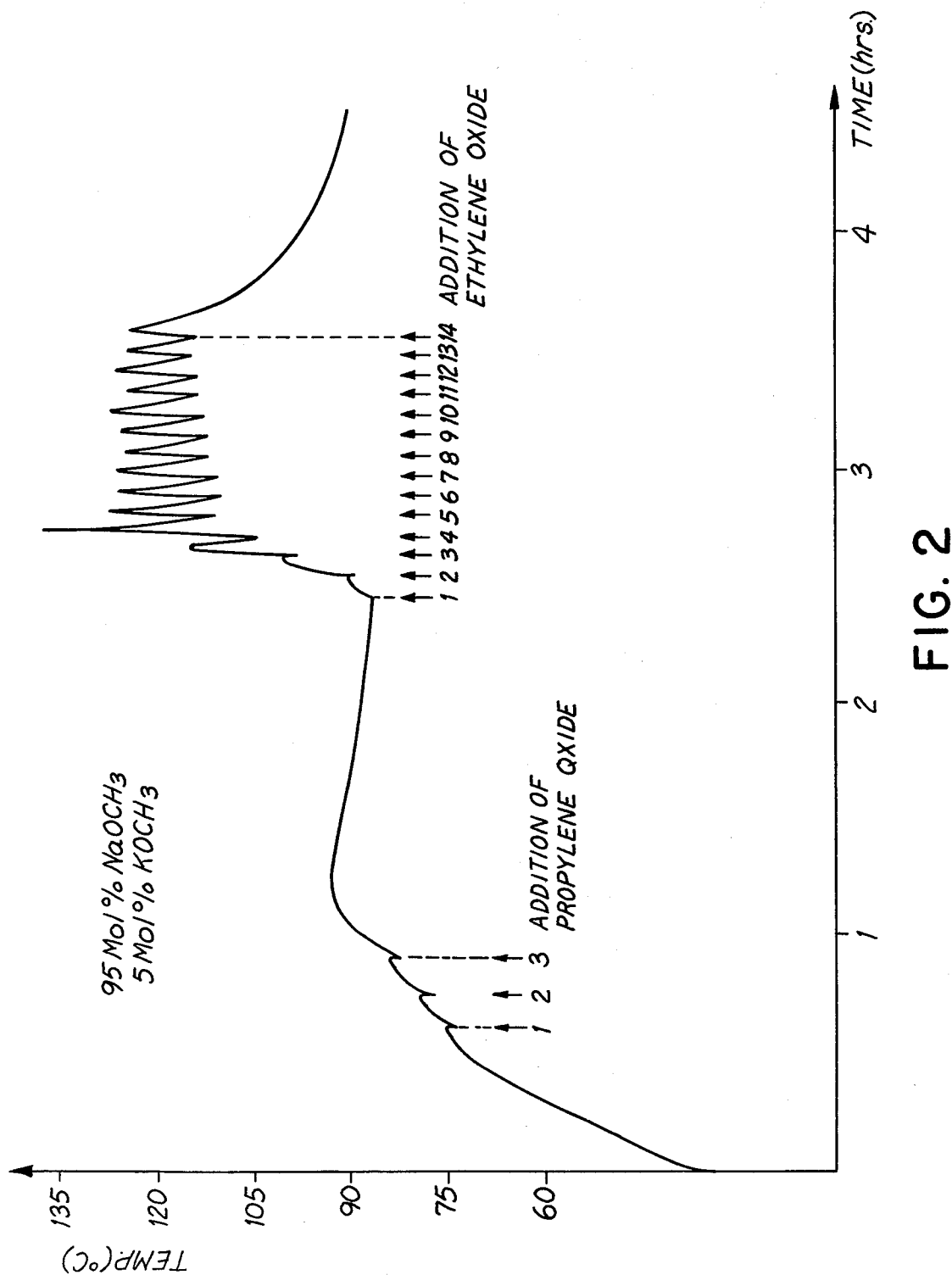
Figure 3:
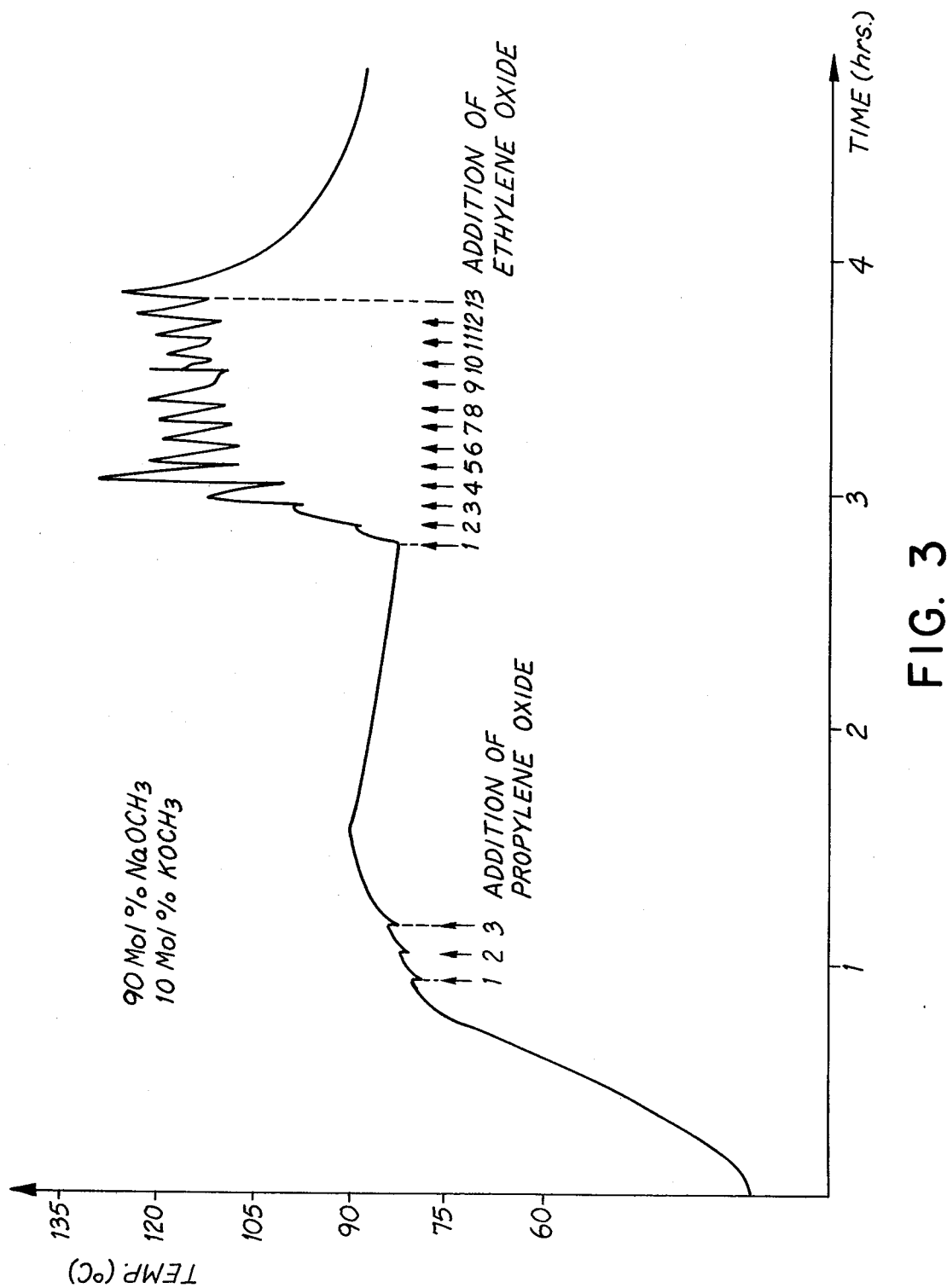
Figure 4:
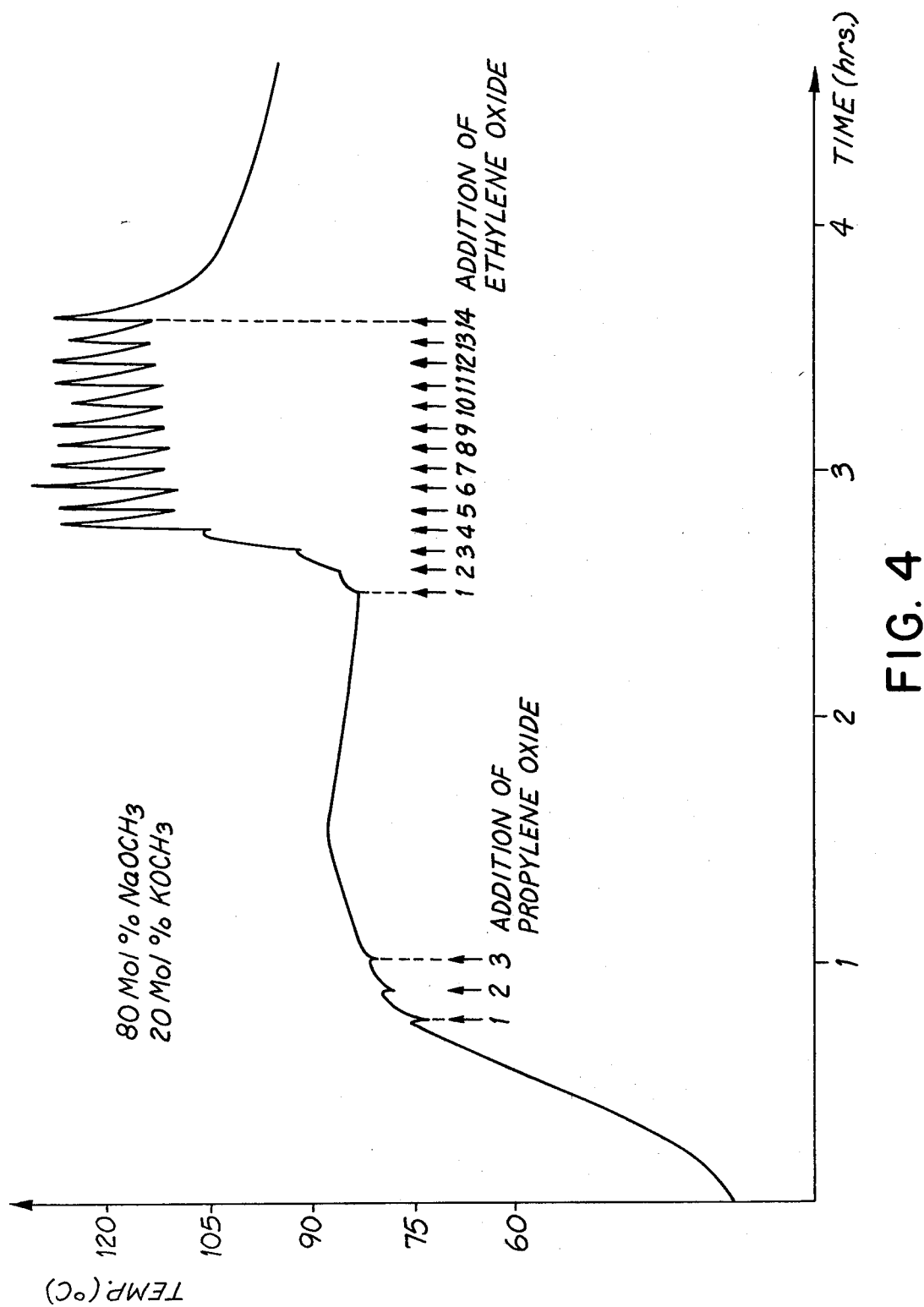

The temperature/time curve of the addition reaction is shown in FIGS. 1 to 4. The relationship between the height of the temperature maximum during the exothermic alkoxylation, the hydroxyl number, the molecular weight, the iodine number, the double bond content in mole percent after neutralization and the $KOCH_3$ content in the alcoholate mixture are shown in Table 1. It is clearly shown that the partial substitution of $NaOCH_3$ by $KOCH_3$ results in an improved control of the reaction, a better agreement between the theoretical hydroxyl number and the one actually found, and a decreased degree of unsaturation of the reaction products.

TABLE 1

| $NaOCH_3/KOCH_3$ Mole Percent | Weight Ratio g/g | Temperature Maximum* °C. | Hydroxyl Number** found | Molecular Weight | Iodine Number | Double Bond Content in Mole Percent |
|---|---|---|---|---|---|---|
| 100/0 | 54.0/0 | >180/after 7th step | 101 | 555 | 1.9 | 6.3 |
| 95/5 | 51.3/3.5 | 92/after 4th step | 82 | 684 | 1.6 | 4.3 |
| 90/10 | 48.6/7.0 | 86/after 4th step | 74 | 758 | 1.1 | 3.3 |
| 80/20 | 43.2/14 | 87/after 6th step | 76 | 738 | 1.2 | 3.5 |

*during the addition of ethylene oxide
**theoretical hydroxyl number = 80.2

EXAMPLE 3

As in Example 1, mixed ethylene oxide and propylene oxide are added to a mixture of 90 mole percent of sodium methylate and 10 mole percent potassium methylate and to pure sodium methylate at reaction temperatures of 110° and 140° C.

The hydroxyl number and the iodine number are given in Table 2 as a function of the reaction temperature. It can be seen that the deviation of the actual hydroxyl number found from the theoretical hydroxyl number increases with temperature and that the degree of unsaturation also increased slightly.

TABLE 2

| NaOCH$_3$/KOCH$_3$ Mole Percent | Reaction Temperature °C. | Hydroxyl Number* found | Molecular Weight | Iodine Number | Double Bond Content in Mole Percent |
|---|---|---|---|---|---|
| 90/10 | 80 | 72 | 779 | 1.1 | 3.4 |
| 90/10 | 110 | 90 | 623 | 1.7 | 4.2 |
| 90/10 | 140 | 95 | 591 | 1.9 | 4.4 |
| 100/0 | 110 | 109 | 515 | 3.1 | 6.3 |

*theoretical hydroxyl number = 80.0

EXAMPLE 4

The procedure of Example 1 is followed with the exception that a methyl allyl polyoxyethylene-polyoxypropylene diether, with a molecular weight of about 800 is used in an amount of 1000 g instead of toluene as a diluent for the mixture of sodium and potassium methylates. The dispersion of the alcoholate mixture is carried out in this case with a higher-shear stirrer with the exclusion of moisture and air.

A sample of the alkali polyether obtained is neutralized with the help of phosphoric acid and, after removal of the water by distillation and of the sodium phosphate formed by filtration with the help of a filter aid, analyzed. Taking into consideration the addition of the product of the process, the hydroxyl number is 71.6, which, assuming a functionality of 1, corresponds to a molecular weight of 783; the iodine number is 0.8, and therefore, corresponds to a 2.6 mole percent double bond content.

EXAMPLE 5

In accordance with the procedure of Example 1, a mixture of 1040 g (approximately 23.6 moles) of ethylene oxide and 1320 g (approximately 22.8 moles) of propylene oxide is added to a mixture of 48.6 g (approximately 0.9 moles) of sodium methylate and 7 g (approximately 0.1 mole) of potassium methylate, which is finely dispersed in 150 g of dimethyl polyoxyethylene-polyoxypropylene diether having a molecular weight of about 2,300.

The hydroxyl number of a neutralized sample of the product is 24.8, which, assuming a functionality of 1, corresponds to a molecular weight of 2260; the iodine number is 1.1 and therefore, corresponds to a double-bond content of 10 mole percent.

I claim:

1. In a process for the preparation of polyoxyalkylene ethers having the formula $$R^1O-[C_nH_{2n}O-]_xM$$

in which

R$^1$ is an alkyl radical with 1 to 4 carbon atoms, an alkylene radical, an aryl radical, or an alkaryl radical, M is an alkali cation, n is any number from 2 to 3, and x is a whole number, by the stoichiometric polymerization of alkylene oxides or their mixtures having the formula $C_nH_{2n}O$ on alkali alcoholates having the formula MOR$^1$ at temperatures of 60° C. to 150° C., the improvement which comprises said alkali alcoholates being mixtures of 1 to 20 mole percent of potassium alcoholate and 99 to 80 mole percent of sodium alcoholate.

2. The process of claim 1 wherein the alkali alcoholates are mixtures of 5 to 15 mole percent of potassium alcoholate and 95 to 85 mole percent of sodium alcoholate.

3. The process of claim 1 or 2 wherein the polymerization is carried out in a diluent.

4. The process of claim 3 wherein the alkali alcoholate mixture is finely dispersed in the diluent.

5. The process of claim 1, 2, or 4 wherein the reaction is carried out in a diluent selected from the group consisting of polyalkyleneglycol monoether and polyalkyleneglycol diethers.

6. The process of claim 1, 2, or 4 wherein the diluent is an aliphatic or aromatic hydrocarbon.

7. The process of claim 6 wherein the diluent is hexane or toluene.

8. The process of claim 1, 2, or 4 wherein the temperature is in the range from 80° C. to 100° C.

* * * * *